Sept. 20, 1927.

R. SPRENGER 1,643,185

NONMETALLIC TOOTHED ELEMENT

Filed Feb. 4 1926

Inventor:
Richard Sprenger,
by
His Attorney

Patented Sept. 20, 1927.

1,643,185

UNITED STATES PATENT OFFICE.

RICHARD SPRENGER, OF HENNIGSDORF, GERMANY, ASSIGNOR TO GENERAL ELECTRIC COMPANY, A CORPORATION OF NEW YORK.

NONMETALLIC TOOTHED ELEMENT.

Application filed February 4, 1926, Serial No. 85,961, and in Germany February 19, 1925.

The present invention relates to toothed elements such as gear wheels, racks, and the like, formed from non-metallic material such as, for example, spinnable textile woven fabric, and an adhesive binder, this being a now well-known type of non-metallic element.

The object of my invention is to provide an improved structure and arrangement in a device of the character referred to, and for a consideration of what I believe to be novel and my invention, attention is directed to the accompanying description and the claims appended thereto.

Figure 1:
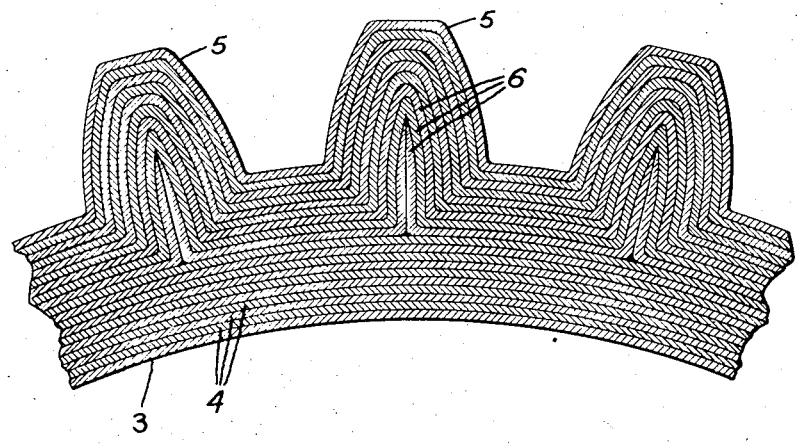
Figure 2:
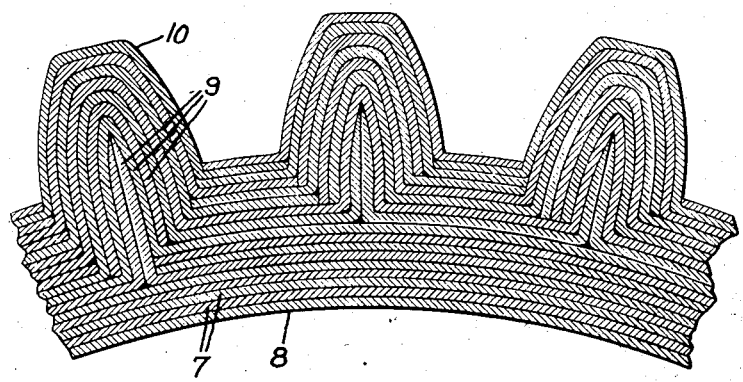

In the drawing, Fig. 1 is a sectional view of a portion of a gear wheel rim embodying the invention, and Fig. 2 is a similar view of a modification.

According to the invention, the element comprises a body portion and a toothed portion formed of continuous layers of non-metallic material united by an adhesive binder, the teeth being formed by outward projections of the successive layers which form the body portion. The layers may comprise one continuous strip or they may comprise separate strips overlapping one another.

In Fig. 1, 3 indicates a body comprising successive layers 4, formed from a continuous strip of material, and 5 indicates teeth on the body which comprise outward projections 6 of the successive layers which go to make up the body.

In Fig. 2, there is shown a construction similar to that shown in Fig. 1, except that the successive layers 7 which go to make up the body 8 and the projections 9 which form the teeth 10, comprises a number of strips arranged in overlapping relation. The strips may be of any suitable length and may be overlapped in such manner as may be found desirable.

In both the structures illustrated, there is provided an intimate connection between the body and the teeth whereby the strength of the teeth is increased considerably.

In the case of a gear wheel as shown in Figs. 1 and 2, the web portion of the gear wheel (not shown) may be formed from metal, the body and teeth being mounted thereon, or it may comprise non-metallic material of the character of that from which the body and teeth are formed.

What I claim as new and desire to secure by Letters Patent of the United States is:

1. A toothed structure comprising a body portion and teeth projecting therefrom, said body portion comprising successive superimposed cylindrical layers of spinnable textile woven fibers united by an adhesive binder and said teeth comprising outward projections of successive layers of said body portion.

2. A toothed structure comprising a body portion and teeth projecting therefrom, characterized by the fact that the body portion comprises successive superimposed cylindrical layers of non-metallic material united by an adhesive binder and that the teeth comprise outward projections of successive layers of the body portion.

3. A toothed structure comprising a body portion and teeth projecting therefrom, characterized by the fact that the body portion and teeth comprise successive superimposed cylindrical layers of non-metallic material united by an adhesive binder.

4. A toothed structure comprising a body portion and teeth projecting therefrom, characterized by the fact that the body portion and teeth comprise successive superimposed cylindrical layers of spinnable textile woven fabric united by an adhesive binder, layers of the body portion and teeth being integral with each other.

In witness whereof, I have hereunto set my hand this 15th day of January, 1926.

RICHARD SPRENGER.